United States Patent [19]
Romstad

[11] 3,789,517
[45] Feb. 5, 1974

[54] EDUCATIONAL FLASH CARDS
[76] Inventor: Catherine J. Romstad, 1776 K St., Menominee, Mich. 20006
[22] Filed: Nov. 27, 1972
[21] Appl. No.: 309,723

[52] U.S. Cl. .................................. 35/9 E, 35/31 E
[51] Int. Cl. ............................................ G09b 1/06
[58] Field of Search... 35/9 R, 9 E, 9 F, 31 E, 75 R, 35/31 R

[56] References Cited
UNITED STATES PATENTS

| | | | |
|---|---|---|---|
| 3,435,541 | 4/1969 | Tacey | 35/31 E |
| 1,525,696 | 2/1925 | Spencer | 35/9 E X |
| 1,641,982 | 9/1927 | McDade | 35/9 E X |
| 1,666,337 | 4/1928 | McDade | 35/9 E X |
| 2,171,873 | 9/1939 | Gould | 35/75 UX |
| 2,693,646 | 11/1954 | Hawkins | 35/9 E |
| 3,152,403 | 10/1964 | Betz | 35/9 F |
| 3,224,112 | 12/1965 | Hanson | 35/9 E |

*Primary Examiner*—Wm. H. Grieb
*Attorney, Agent, or Firm*—Robert G. McMorrow

[57] ABSTRACT

Educational teaching aids in the form of flash cards for visual display of problems and solutions in teachings of mathematics have sleeve like pockets connected together at their sides and at one end. The other end is open to receive a slidable card, and the sleeve has at least one window opening therein. Indicia is inscribed both on the card and on the sleeve, and certain of the indicia can be displayed in the window selectively.

9 Claims, 16 Drawing Figures

Patented Feb. 5, 1974
3,789,517
3 Sheets-Sheet 1
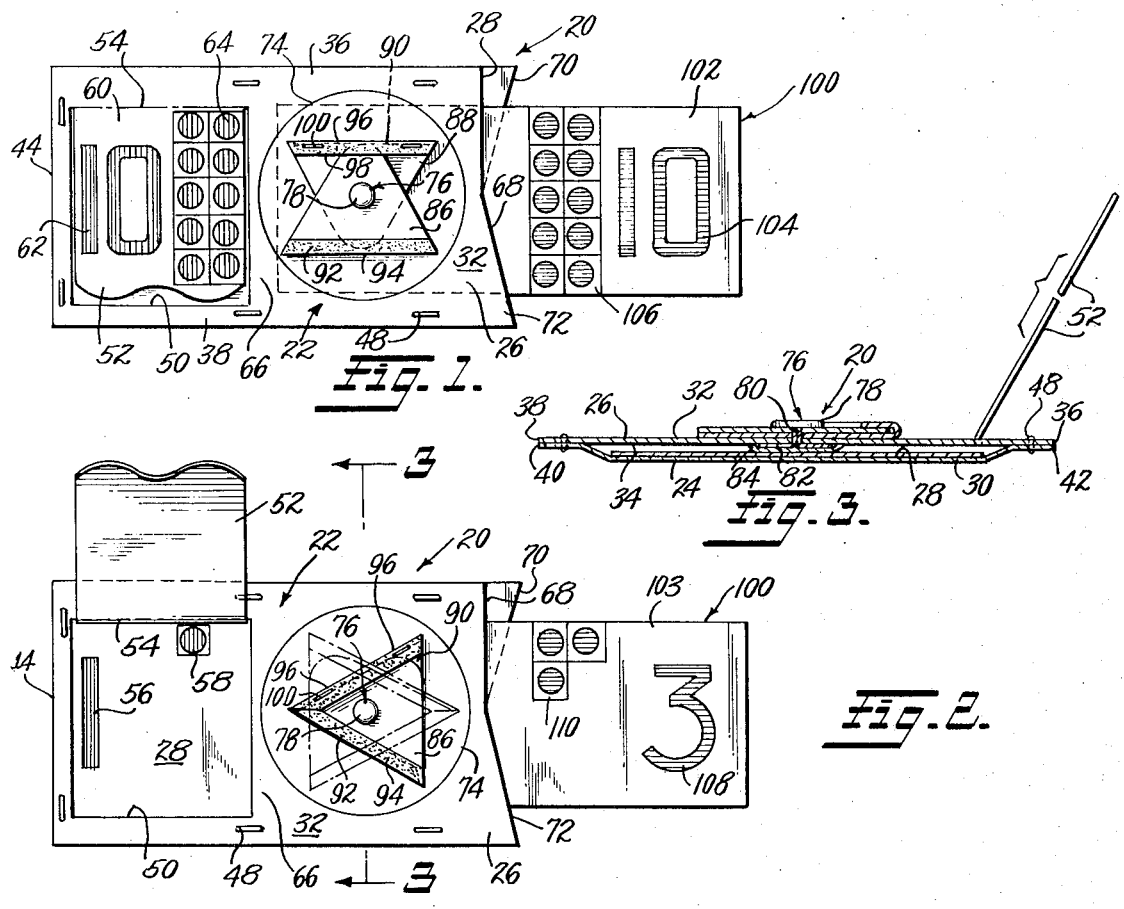
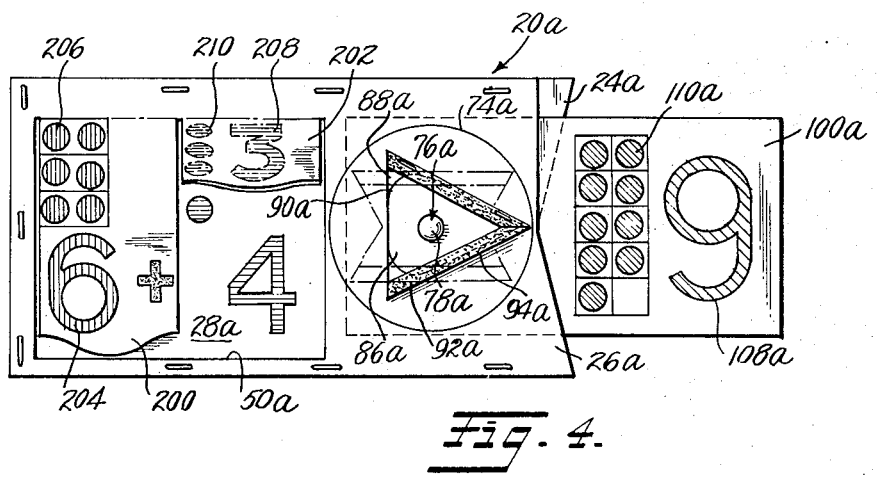

Patented Feb. 5, 1974 3,789,517
3 Sheets-Sheet 2
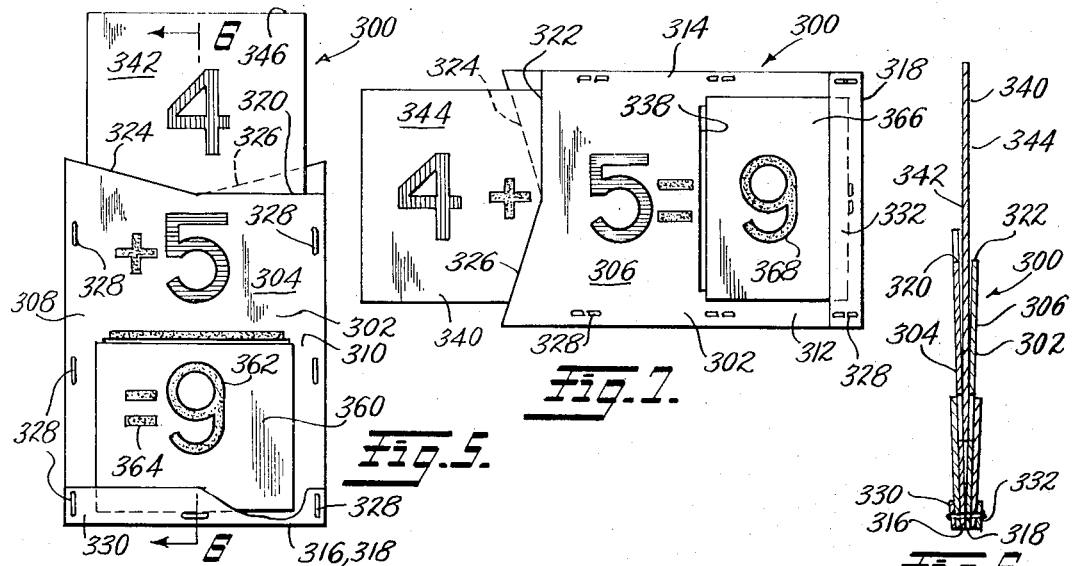
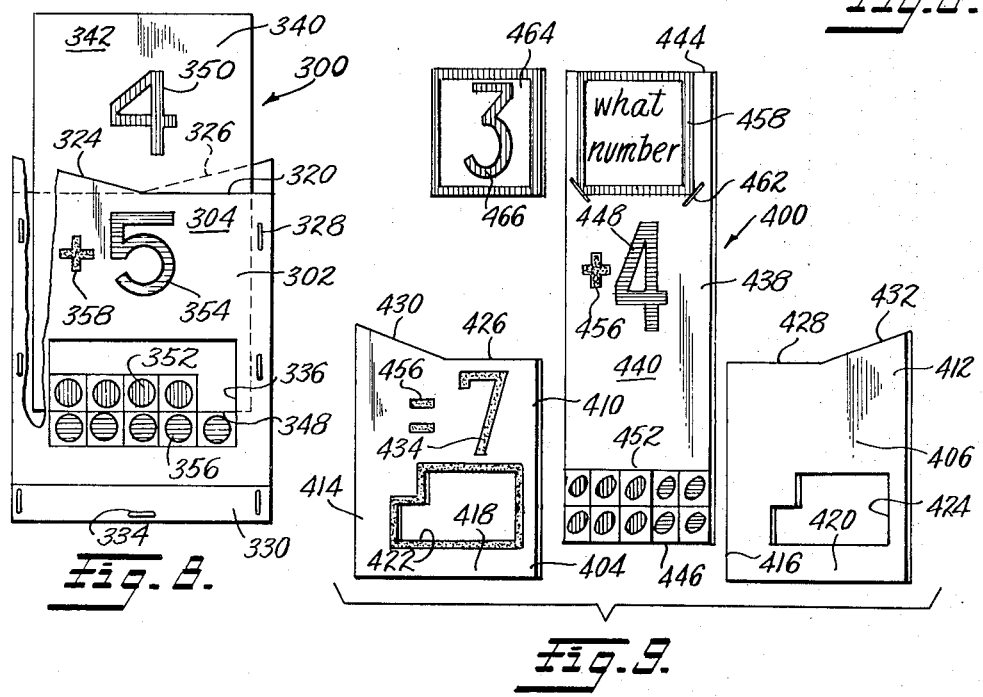
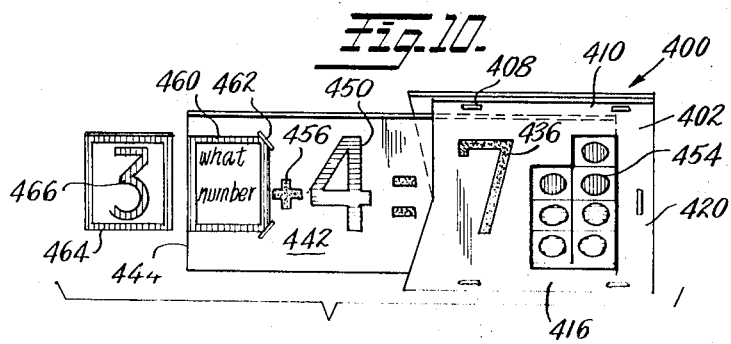

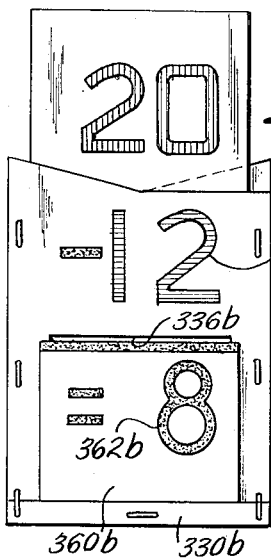
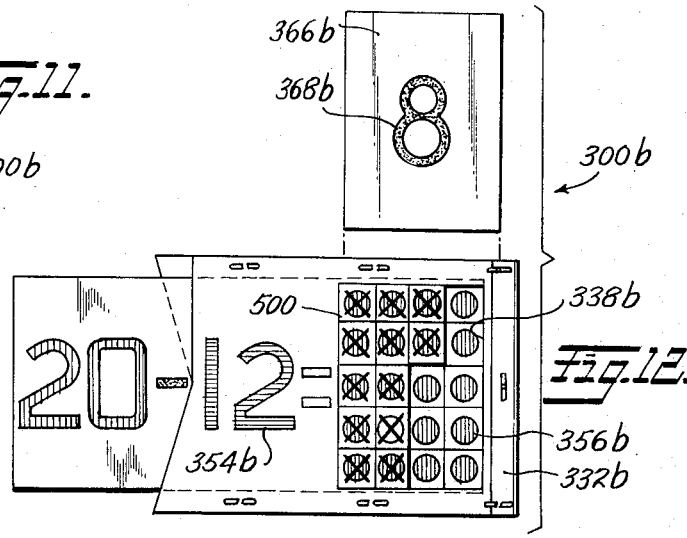
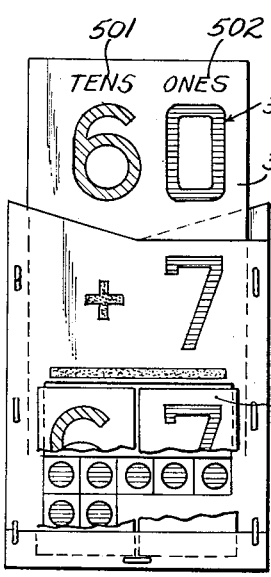
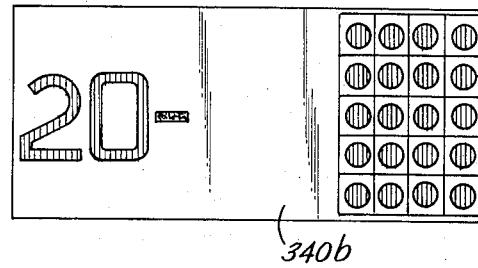
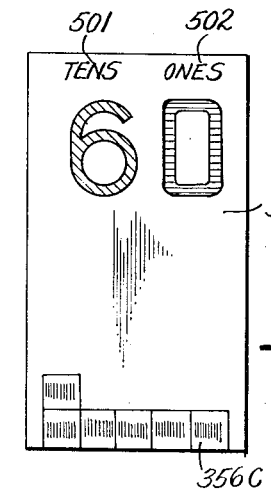
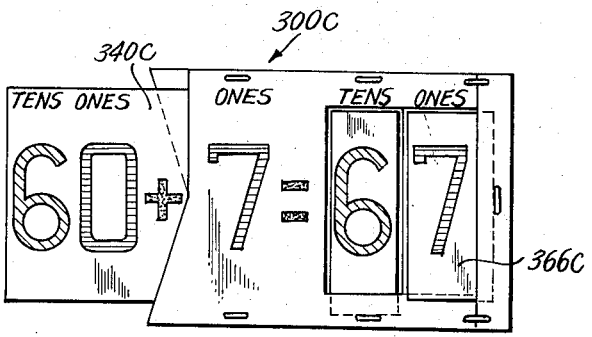

EDUCATIONAL FLASH CARDS

BACKGROUND OF THE INVENTION

1. Field of the Invention

This invention pertains to visual aids for teaching subjects such as mathematics, and more particularly to a flash card apparatus for sequential display of first a problem and then its solution.

2. Statement of the Prior Art:

Jacketed cards adapted for selective exposure of materials printed on the cards have heretofore been proposed. Examples of such prior proposals may be found in the below listed U. S. patents:

| Patent No. | Patentee | Issue Date |
| --- | --- | --- |
| 1,525,696 | Spencer | Feb. 10, 1925 |
| 1,641,982 | McDade | Sept. 13, 1927 |
| 1,666,337 | McDade | April 17, 1928 |
| 2,171,873 | Gould | Sept. 5, 1939 |
| 2,693,646 | Hawkins | Nov. 9, 1954 |
| 3,152,403 | Betz | Oct. 13, 1964 |
| 3,224,112 | Hanson | Dec. 21, 1965. |

SUMMARY OF THE INVENTION

The present invention provides a visual teaching aid which is particularly suited to providing the student with a conceptual analytic approach to problem solving in mathematics. The teaching system provided thereby is adapted to conveyance of concepts in addition, subtraction, multiplication, numerical relationships, and the like. The method further provides for the relation of numerical indicia to object representation of those numbers.

An objective of this invention resides in the provision of a device as aforesaid in which a problem is posed by manipulation of the components to one position, and the solution to the problem revealed by movement of the components to a further position. In certain forms of the device, this involves the formation of window units of unique configuration.

The units hereof may be conveniently color coded for ease of instruction, and to permit visualization by association on the part of the learner.

A still further unique characteristic of the invention resides in the conceptual relationship of numbers to objects. By representation of the objects as indicia, the necessity for providing large groups of objects for training purposes is obviated.

In elementary mathematical educational endeavors, it has been found that the preferable introductory approach with children is to introduce concepts of mathematics through the use of tangible objects. Thereafter, a transition is effected to abstract numerical theory. Many children experience great difficulty in making this transition. The present invention facilitates the switch from adding or subtracting things (e.g., sticks, spheres, etc.) to numerical representations of them. This is accomplished through correlation on the cards of the things with the numbers. Moreover, the physical manipulation of objects sometimes leads to development of erroneous concepts, since if the attention span of the learner is exceeded during manipulation, the sequence is broken and confusion occurs. In employment of the apparatus of this invention, the numerical indicia and conceptual indicia (that is, the indicia representative of the objects) can be compared during problem solving, and confusion does not occur.

Another object of the invention, in certain forms thereof, is to provide a two-sided device in which material is horizontally arranged on one side and vertically arranged on the other side, thereby permitting display in sequence of both of these arrangements.

The provision of ready access to answers meets the goal of permitting the learner to achieve early success in problem solving and thereby enhances learning. This also permits independent advance of learning at the rate best suited to the individual, and has been found advantageous in training exceptional children.

In one form of the invention, movable characters are employed to convey the concepts of numbers greater than or less than the compared numerals. The mobility of these characters enhances interest in the use of this form of the device.

Other and further objects and advantages of the invention will become apparent to those skilled in the art from a consideration of the following specification when read in conjunction with the annexed drawings.

BRIEF DESCRIPTION OF THE DRAWINGS

FIG. 1 is a plan view of a flash card combination of the present invention for use in the teaching of mathematics showing a card holder including a changeable sign together with a removable card having a result on both sides thereof;

FIG. 2 is a plan view of the flash cards with elements associated therewith in a different position and the removable card reversed;

FIG. 3 is an enlarged transverse sectional view through the flash card, taken on the line 3—3 of FIG. 2;

FIG. 4 is a plan view of a modified form of flash card;

FIG. 5 is another modified form of flash card used for teaching addition, the indicia thereon being readable when the card is held in a vertical position;

FIG. 6 is a vertical sectional view taken on line 6—6 of FIG. 5;

FIG. 7 is a rear elevational view of the assembly of FIG. 5, the indicia being readable when the card is held horizontally;

FIG. 8 is an elevational view, similar to FIG. 5, with the answer card removed and parts of the flash card holder broken away;

FIG. 9 is a disassembled perspective view of still another form of flash card;

FIG. 10 is an exploded perspective view of the reverse side of the flash card of FIG. 9;

FIG. 11 is an elevational view of a flash card arrangement for teaching subtraction;

FIG. 12 is a disassembled rear elevational view of the flash card of FIG. 11 with the answer tab removed to reveal the arrangement of the objects;

FIG. 13 is a plan view of the reversible card per se;

FIG. 14 is an elevational view of a flash card assembly for teaching the nomenclature of the columns of figures in a mathematical problem, the answer cards being broken away to disclose the arrangement of a set of object indicia on the card holder;

FIG. 15 is an elevational view of the reversible card of FIG. 14 showing the arrangement of a set of different object indicia thereon; and FIG. 16 is a rear elevational view of the flash card assembly of FIG. 14 illustrating the indicia thereon when held in a horizontal position.

DESCRIPTION OF THE PREFERRED EMBODIMENTS

Referring to the drawings in more detail, and initially to FIGS. 1 through 3, a first form of educational flash card 20 is shown therein. The assembly 20 includes, as a basic component, an elongated pocket 22 having a pair of similar panels including a back panel 24 and a front panel 26. The back panel has a forward face or surface 28 and an opposite rear face 30, and as shown in FIG. 3, is extended so as to be slightly spaced away from the front panel. The front panel similarly has an outer surface 32 and an inner surface 34. The back panel and front panel are similar in outline configuration, each having side edges 36, 38, and 40, 42, respectively, and first end edges 44 and 46.

The panels form a pocket by means of connection to one another by connectors joining the frame adjacent the side edges 38, 40, and 36, 42, and the end edges 44 and 46. Such fastening means or connectors are here shown as comprising conventional metallic staples 48, but it will be understood that other fastening means may be substituted where this is deemed desirable.

The front panel is formed with a window opening 50 adjacent the end edge 44 thereof, and a flap 52 is hingedly joined at 54 along a fold line or crease for selective movement with relation to the window. Numerical indicia 56 and correlated object indicia 58 are inscribed or printed on the face 28 of the back panel beneath the window so as to be exposed when the flap 52 is pivoted to the position shown in FIGS. 2 and 3. The flap outer face 60 has different numerical indicia 62 and object indicia 64 thereon.

At a central body section 66, the panels 24 and 26 are connected, as by a suitable mastic. Outwardly of this connection the panels are joined only at their sides as aforesaid, and the outer ends 68 and 70 are not joined. These ends each include opposite diagonal portions 72 which facilitate access to the pocket formed thereby.

On the outer face 32 of the front panel is a circle 74. Mounted substantially at the center of that circle is a stud 76 comprising an enlarged head 78 with a vertical shaft 80 which extends through the panel 26. Within the pocket, the stud has an enlarged portion 82 to prevent withdrawal, preferably provided with a layer 84 of covering tape. Also pivotally mounted on the stud shaft 80 are two generally triangular indicator members 86 and 88. The indicator 86 has a slightly rounded apex 90 and has a bar 92 extending along its base 94. The bar is of contrasting color with respect to the remainder of the member 86. The member 88 is positioned adjacent the panel 26 and has a base 96. Secured to the second indicator 88 along its base 96 is a bar element 98 which is coextensive therewith. The bar element is secured to the base by fasteners such as staples 100 adjacent its ends, and forms a trackway under which the rounded apex 90 of the indicator 86 rides.

A reversible card 100 has opposite sides 102 and 103 (FIGS. 1 and 2). On each side of the card are correlated sets of numerical and object indicia 104, 106, and 108, 110 which are unlike.

The employment of this form of the invention in a mathematical teaching procedure relates to the concepts of numerical equality or inequality. With the flap 52 in the down position shown in FIG. 1, and the card 100 inserted so as to expose the side 102, the indicia sets 62, 64 and 104, 106 are seen by the user. If the student recognizes the equality of these sets, he positions the indicators 86 and 88 such that the bar and bar elements 92, 100 form an equal symbol (=). If however, the flap is lifted and the card reversed to show indicia sets 56, 58 and 108, 110, the student or the instructor then pivots the indicators so that the bars show that numeral 1 is less than (<) numeral 3. From these illustrations it will be observed that many combinations are possible (other cards can be used to increase the available combinations) resulting in drill in the concepts of equality, greater than or less than.

FIG. 4 discloses a very similar form of the invention and the same reference characters have been applied to corresponding components, the letter "a" being appended for differentiation. In the form 20a of the invention, two flaps 200, 202 are hinged to the front panel 26a over the window 50a. Each flap has sets of numerical and object indicia 204, 206 and 208, 210 thereon, and the flap 200 also has a mathematical symbol (+) signifying addition. On the face 28a of the back panel 24a there is provided two sets of numerical and object indicia and another symbol (not shown) below the flap 200. This permits the learner to graduate from the cards 20 wherein single equations are presented, to compound problems as presented on the cards 20a. The range of employment is substantially increased also.

FIGS. 5 through 8 show a card assembly 300 useful in training in transition of the student from object manipulation to numerical concepts such as to addition. The assembly 300 comprises a pocket 302 having a first panel 304 and a second panel 306. Each of said panels has side edges 308, 310 and 312, 314. The panels also have co-aligned base ends 316 and 318 and opposite open ends 320 and 322. These latter ends are free of one another and each has oppositely positioned diagonal portions 324, 326 for facilitating entry of a card between the panels.

The sides of the panels 304 and 306 are joined together adjacent the side edges by staples 328 or other suitable fastening means. Extending along the aligned ends of the panels and coextensive therewith are base strips 330, 332. A series of connectors (for example, staples) 334 extend through the base strips and the panel ends serving to both join the panels and strips together and to form shallow open ended envelopes at the base on each side of the pocket — for a purpose appearing hereinafter.

Each of the panels has a window 336, 338 formed therein.

A problem card 340 is slidably mounted in the pocket between the panels. The problem card has opposite sides 342, 344, and has a top end 346 and a bottom end 348. The side 342 has numerical indicia 350 and correlated object indicia 352 thereon. The panel 304 also has numerical indicia 354 and correlated object indicia 356, the latter being positioned immediately below the window 336. The panels 304 and 306 are joined by a mastic, or the like immediately below the object indicia 356, limiting the depth of insertion of the problem card to that shown in FIG. 8. A mathematical symbol 358 accompanies the numerical indicia 354.

With the components positioned as shown in FIG. 8, the problem of addition of numerical indicia 350 and 354 is posed. The solution appears only by reference to the associated object indicia 352 and 356. The apparatus however, also includes separable answer cards 360 on which a numerical solution indicia 362 appears. This may be placed over the object indicia as shown in FIG. 5, the answer card being held therein by engagement in the shallow envelope provided by the base strip 330. The answer card also has the equal symbol 364.

The flash card 300 is reversible whereby the student may observe the same equation in horizontal arrangement, a second answer card 366 being engageable with the base strip 332. The card 366 bears numerical indicia 368.

Another embodiment of the invention is shown in FIGS. 9 and 10. Here the flash card assembly 400 comprises a pocket 402 with panels 404 and 406. The panels are connected by staples 408 extended through their aligned sides 410, 412 and 414, 416 and through aligned base ends 418, 420 thereof. Each of the panels has an L-form window 422, 424 therein. The top edge 426 and the top edge 428 are free and have opposite diagonal sections 430, 432. The panels have first numerical indicia 434, 436 thereon (vertically and horizontally oriented, respectively).

A problem card 438 of elongated rectangular configuration is slidably received in the pocket. The problem card has opposite sides 440, 442, and ends 444, 446. Numerical indicia 448, 450 appears on the opposite sides of the card, as does a series of object indicia 452, 454. The latter are preferably, but not necessarily color coded in blocks, one block corresponding to the first indicia in number and the other to the second indicia in number. Appropriate mathematical symbols 456 appear at different locations on the panels and problem card.

Immediately above the second indicia 448 and 450, each side of the problem card has a box 458, 460. The card has diagonal slits 462 therein adjacent the boxes. An answer card 464 corresponding in size to said boxes is frictionally engaged in these slits. The answer card bears numerical indicia 456.

The configuration of the window is such that the solution to the problem is exhibited via the medium of the color coded object indicia 452 and 454 when th problem card is inserted to the depth shown in FIG. 10. The student or instructor may then insert the correct answer card.

The form of the invention disclosed in FIGS. 11 through 13 is highly similar structurally to that of FIGS. 5 through 8 and like reference characters are applied with a letter "b" appended. In this instance, however, the flash card 300b is employed in teaching subtraction. The windows 336b and 338b are L-form in configuration, and the object indicia 356 appearing adjacent the base of the answer card is exposed through these window openings. The numerical indicia 354b of the panels is matched by object indicia 500 which are denoted by an overprinted "X" to convey the "take away" concept. Once again, answer cards 360b and 366b having correct numerical answer indicia 362b and 368b are engaged under the base strips 330b and 332b.

The concept of "tens" and "ones" is demonstrated by the card assembly 300c of FIGS. 14 through 16. This form of the invention isstructurally related to those forms shown in FIGS. 5 through 8 and 11 through 13. The same reference characters are employed as in the first described forms, but the letter "c" is appended to the numerals describing this form of the invention to indicate the distinction. In this form, at least one set of problem card numerical indicia 350c comprises a two digit numeral. These are labeled as "tens" (at 501) and as "ones" (at 502). The "tens" are so specified in the object indicia 356c on the problem card 340c. The opposite faces of the answer card and the panel have horizontally disposed indicia, but are otherwise the same. In order to carry through the multiple digit concept, the answer cards 360c and 366c are each composed of two separate cards which may be manipulated into correct position as the learner acquires proficiency in the use of two digit numbers and in mathematical computations involving two digit numbers.

I claim:
1. In an educational flash card device, the combination comprising:
an elongated pocket component having front and back panels;
each of said panels having side edge portions and opposite end edge portions;
means securing the front and back panels together along the side edge portions and one pair of end edge portions;
the remaining end edge portions being free to provide an access to the pocket component;
at least the front panel having an enlarged window opening formed therein;
a card slidably mounted in the pocket and projecting from the access thereof, the card having at least two areas;
the window being located on the front panel in such position as to expose one of the card areas upon alignment of said area with the window, and the card being of a length such that the other of said areas is positioned outwardly of said pocket compartment when so aligned; and
the front panel having indicia thereon, and the card having spaced apart indicia thereon in said areas, at least one of the card indicia being adapted for alignment in said window to provide a solution to a problem presented by the indicia on the front panel and the other of said card indicia.

2. In an educational flash card device, the combination comprising:
an elongated pocket component having a back panel with a forward face and a rear face, the back panel having side edges and end edges;
one of the end edges having a diagonal portion;
a front panel having side and end portions, and being substantially coextensive in length and width to the back panel;
fastening means extending through the side portions and side edges, respectively, of the front and back panels and through one aligned pair of end portions and end edges thereof to affix the panels together along their side portions and edges and along said end portion and edge;
the front panel having at least one flap thereon, said flap comprising a section of the panel separated therefrom at three edges and hingedly connected at a fourth edge along a fold line;
the flap having indicia thereon and being adapted for swingable movement about the fold line to expose different indicia on the forward face of the back panel;
the front panel having a leading section with a free outer edge having a diagonal portion and an inner edge fixed to the back panel whereby the leading section and the back panel form an end pocket;

pivot pin means extending through the leading section;

a pair of indicators having openings therein, the pivot pin means extending through the openings, and the indicators being swivel mounted exteriorly of the leading section of the front panel;

the indicators having bar indicia thereon and being movable relative to one another to positions in which the bar indicia form, alternately, an equal symbol, a greater than symbol or a less than symbol; and a reversible card slidably mounted in the end pocket and being of a length such that a section thereof is exposed, such exposed section having different indicia on either side thereof.

3. The invention of claim 2, wherein:

the indicia on said card in each instance comprises numerical indicia and accompanying object indicia.

4. The invention of claim 2, wherein:

the leading section of the front panel has a circle inscribed about the arc of movement of the indicators; and the indicators are substantially triangular in form.

5. In an elongated flash card device, the combination comprising:

an elongated pocket having a first panel and a second panel, said panels each having an outer face, side edges and end edges;

each of said panels having an opening formed therein;

base strips for each of the panels coextensive in length with one adjacent pair of the end edges;

fastening means extending through the panels adjacent the side edges, and fastening means extending through the panels and through the base strips adjacent said one adjacent pair of end edges;

the opposite end edges of the panels being diagonal in opposing directions;

the panels having co-aligned openings formed therein and having indicia inscribed thereon related in position to said openings;

a problem card slidably mounted in the pocket and being of a length such that a section thereof is exposed, the card having indicia thereon; and answer cards engageable between the base strips and panels over said openings to reveal a correct solution to a problem posed in the indicia of the panels and the card.

6. The invention of claim 5, wherein:

the indicia in each instance comprises numerical indicia and accompanying object indicia.

7. The invention of claim 5, wherein:

the openings are L-form to selectively expose a given quantity of object indicia upon inward movement of the problem card.

8. The invention of claim 5, wherein:

the answer cards are separable from said pocket.

9. In an elongated flash card device, the combination comprising:

an elongated pocket having a first panel and a second panel, each of said panels having an outer face, side edges and end edges;

fastening means joining the panels together along the side edges and along one aligned pair of said end edges;

the other pair of end edges being free to provide access to the pocket;

the panels each having an opening therein, said openings being located adjacent the joined pair of end edges of the panels;

the panels having first indicia thereon adjacent the openings;

a problem card slidably related to the pocket and projecting outwardly of the access to the pocket;

the problem card having second indicia thereon relatable to the first indicia of the panels;

the problem card having an answer box thereon and having a series of slits formed therein adjacent the box; and an answer card engageable in said slit over the answer box, said answer card having third indicia thereon correlated to the first and second indicia.

* * * * *